(12) United States Patent
Edwards et al.

(10) Patent No.: US 12,141,805 B2
(45) Date of Patent: Nov. 12, 2024

(54) ACCOUNT SECURITY SYSTEM

(71) Applicant: Capital One Services, LLC, McLean, VA (US)

(72) Inventors: Joshua Edwards, Philadelphia, PA (US); Michael Mossoba, Great Falls, VA (US); Abdelkader Benkreira, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/177,815

(22) Filed: Mar. 3, 2023

(65) Prior Publication Data

US 2023/0206240 A1     Jun. 29, 2023

Related U.S. Application Data

(60) Continuation of application No. 17/375,102, filed on Jul. 14, 2021, now Pat. No. 11,615,418, which is a division of application No. 16/773,466, filed on Jan. 27, 2020, now Pat. No. 11,093,943.

(51) Int. Cl.
| | |
|---|---|
| *G06Q 30/00* | (2023.01) |
| *G06F 16/51* | (2019.01) |
| *G06Q 20/40* | (2012.01) |
| *G06Q 30/018* | (2023.01) |
| *G06Q 40/02* | (2023.01) |
| *G06V 20/40* | (2022.01) |
| *G06V 40/16* | (2022.01) |
| *H04L 9/40* | (2022.01) |

(52) U.S. Cl.
CPC ....... *G06Q 20/40145* (2013.01); *G06F 16/51* (2019.01); *G06Q 30/0185* (2013.01); *G06Q 40/02* (2013.01); *G06V 20/40* (2022.01); *G06V 40/172* (2022.01); *H04L 63/0861* (2013.01)

(58) Field of Classification Search
CPC ......... G06Q 20/40145; G06Q 30/0185; G06Q 40/02; G06F 16/51; G06K 9/00288; G06K 9/00711; H04L 63/0861
USPC ..................................................... 705/35, 44
See application file for complete search history.

(56) References Cited

U.S. PATENT DOCUMENTS

| 9,147,061 B1* | 9/2015 | McClendon ......... G06V 40/167 |
| 9,934,504 B2* | 4/2018 | Wang ................. G06Q 30/0643 |
| 2017/0076522 A1* | 3/2017 | Ives-Halperin ......... H04W 4/80 |

(Continued)

*Primary Examiner* — William E Rankins
(74) *Attorney, Agent, or Firm* — Foley & Lardner LLP

(57) ABSTRACT

In certain embodiments, image-feature malicious-activity detection and access prevention may be facilitated, where an activity notification associated with a transaction triggers feature detection for at least one image related to a different transaction. In some embodiments, a first image (received in connection with a first transaction) may be associated with the first transaction, and a second image (received in connection with a second transaction) may be associated with a second transaction. In response to a malicious activity notification associated with the first transaction, an identifying characteristic (e.g., a facial feature) detected in the first image may be used to determine whether to prevent access to an account related to the second transaction. As an example, in response to determining that the identifying characteristic is present in the second image, access to the account related to the second transaction may be prevented.

16 Claims, 5 Drawing Sheets

(56) References Cited

U.S. PATENT DOCUMENTS

| | | | |
|---|---|---|---|
| 2019/0026449 A1* | 1/2019 | Richman | G06V 10/235 |
| 2019/0122222 A1* | 4/2019 | Uechi | G06Q 20/42 |
| 2019/0220866 A1* | 7/2019 | Starr | G06V 40/172 |
| 2020/0134151 A1* | 4/2020 | Magi | G06V 40/168 |

* cited by examiner

ACCOUNT SECURITY SYSTEM

CROSS-REFERENCE TO RELATED APPLICATIONS

This application is a continuation of U.S. patent application Ser. No. 17/375,102, filed Jul. 14, 2021, which is a divisional of U.S. patent application Ser. No. 16/773,466, filed on Jan. 27, 2020, the content of which are hereby incorporated by reference in its entirety.

BACKGROUND

Individuals often have a number of secure accounts that may be, for example, accessed remotely using a personal computing device. The personal computing device may be a computer, tablet, or smart phone. The account information may be hosted on a remote server that is accessed over the internet or cellular network. The remote accessibility makes the account information vulnerable to access and manipulation by unauthorized individuals. Unlike in-person interactions, online accounts do not have a visual confirmation or record of the individual accessing the account. The level of anonymity provided by remote accessibility can make online accounts an attractive target for unauthorized manipulation. Therefore, adding a level of security by capturing a visual image of the user while they are accessing an account may be advantageous.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein. Disclosed are systems, methods, and non-transitory computer-readable storage media a technical solution to the technical problem described. A system comprising: a customer authentication system configured to authenticate a customer to access an account associated with an account identifier provided by a user device; a database configured to store an account information about the account associated with the account identifier wherein the account information includes an image authentication preference; an account server configured to: retrieve the account information from the database when the customer authentication system authenticates the customer; receive from the database the account information; determine whether the image authentication preference is on; provide a prompt to the user device to activate a camera on the user device; receive an electronic image from the user device when the prompt is accepted; and deny access to the account when the prompt is not accepted; and a security processor configured to receive the electronic image from the account server, wherein the security processor is configured to: determine whether the electronic image contains an identifiable face; and allow access to the account associated with the account identifier when the electronic image contains the identifiable face.

A method comprising: receiving an account identifier from a user device; authenticating a customer to access an account associated with the account identifier provided by the user device; providing a prompt for the user device to activate a camera on the user device; receiving a response from the user device indicating whether the camera has been activated; denying access to the account when the response indicates that the camera has not been activated; receiving an electronic image footage when the user device has been activated; storing the electronic image footage on a database; associating the electronic image footage with the account identifier; analyzing the electronic image footage to determine whether there is facial identification; allowing the user device to access the account associated with the account identifier when there is facial identification in the electronic image footage; and preventing the user device from accessing the account associated with the account identifier when there is no facial identification in the electronic image footage.

A fraud detection method comprising: receiving an electronic image received from a first user device while the first user device effectuates a first transaction; storing on a remote database a first electronic image captured from the first user device; associating the first electronic image with the first transaction on the remote database; receiving the electronic image received from a second user device while the second user device effectuates a second transaction; storing on the remote database a second electronic image captured from the second user device; associating the second electronic image with the second transaction on the remote database; receiving a fraud notification associated with the first transaction; retrieving the first electronic image from the remote database; analyzing the first electronic image to detect an identifying characteristic; determining whether the identifying characteristic is present in the second electronic image; identifying a second account when the identifying characteristic is in the second electronic image; and preventing access to the second account when the identifying characteristic is determined to be present in the second electronic image above a known degree of certainty.

DETAILED DESCRIPTION

Figure 1:
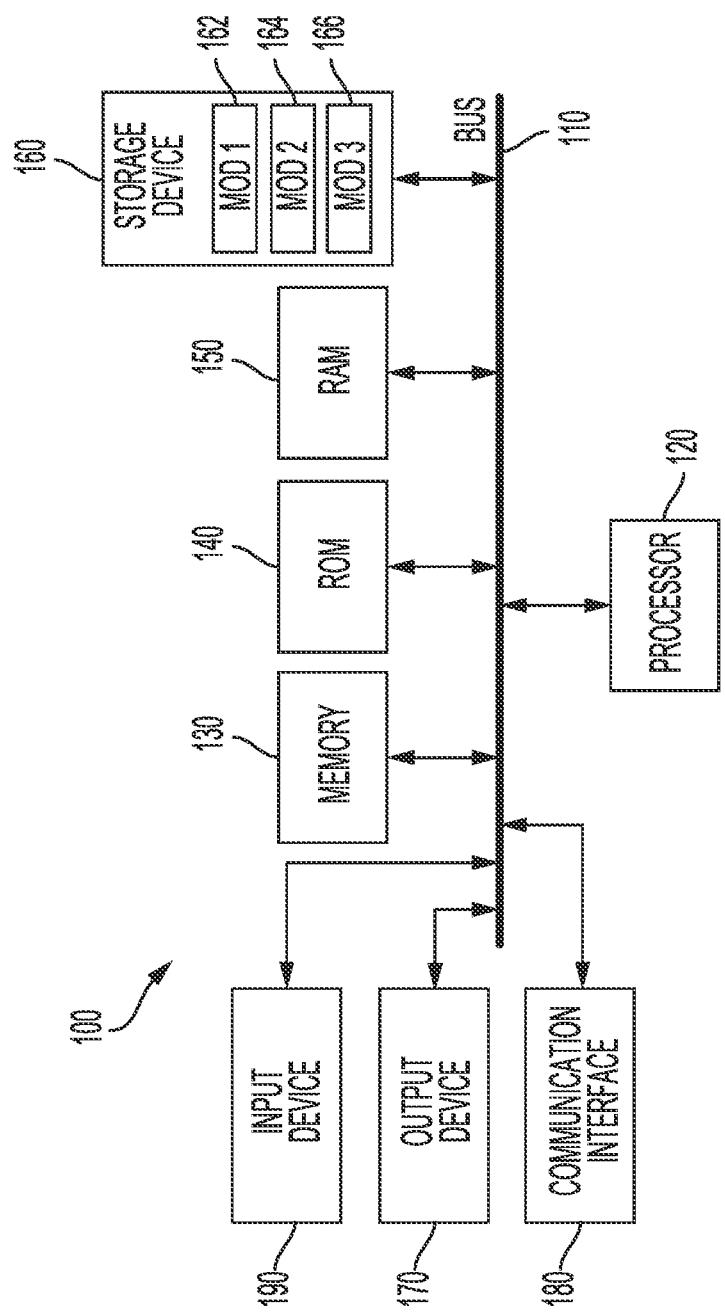
FIG. 1 illustrates an example system embodiment.

Various embodiments of the disclosure are described in detail below. While specific implementations are described, it should be understood that this is done for illustration purposes only. Other components and configurations may be used without parting from the spirit and scope of the disclosure.

The present disclosure is directed to methods, systems, and non-transitory computer-readable media for a using a camera or other imaging device for documenting and recording a person making a transaction or accessing an account using a computing device. A webcam security feature may be an option that a user may choose to implement. The webcam security feature may be tied to the user account. Personal computing devices often have an imaging device, for example, a camera that can record and stream images or video footage over a network such as the internet or a cellular connection. These devices are commonly referred to as a webcam. In an embodiment, an account may have a security feature that requires the webcam be activated in order to access the account.

The device may stream the image or footage taken from the webcam to a remote server or database. Thus a user of the device may not be able to tamper with or delete the webcam output. An embodiment may store the webcam output. In some embodiments the webcam output is not associated with a user but with the transaction. Associating the webcam output with the transaction may be advantageous so biometric data of the user is not stored by a third-party associated with a user or account. Associating the webcam output with the user may further protect the identity and data of customers or users. A user may attempt to access an account by navigating to a website or opening an application running on the device. Once at the website or in the application, a user name or account identifier may be required. Accessing the account may further include entering a password. When the password entered corresponds to the password for the account, the server may determine whether the account has a webcam security preference. When the account has a webcam security preference, the server hosting the account may provide an instruction for the user device to activate a webcam. The instruction may also be provided by an application for accessing and using the account. The instruction may contain a prompt that, when selected, may turn on the camera or the application may give an instruction to the user to navigate to a camera application. The camera may be turned on automatically or by a user. The server may receive a notification that the camera has been activated. If the camera is not activated, the user device may be denied access to the account.

If the camera has been activated, the images or footage from the camera may be provided to the server and/or a database. The images or footage may be stored on the database and associated with the respective account. In other embodiments the images and footage may be stored only when a transaction has occurred, and may be associated with that transaction. The footage may be stored for a certain length of time to allow the authorized user to identify any potentially fraudulent transactions. If no fraud is identified within the set period of time, the footage may be deleted, compressed, or move to a new storage location. Storing the footage for a set amount of time may optimize the required storage space. In some embodiments, the set amount of time may be determined by the user or may be based on the transaction. For example, paying a premium may result in footage stored for a longer period of time. In other embodiments, the type, risk, or value of the transaction may determine the amount of time the footage is stored. For example, if a transaction is a balance inquiry, but does not move or withdraw funds, the transaction may be considered low risk and low value. If a small amount of money is withdrawn, then the transaction may be considered low risk medium value. If account information is accessed the transaction may be considered high risk. If a large amount of money is withdrawn, the transaction may be considered medium risk high value. The type, value, and/or risk may be used to determine how long the footage is stored to optimize storage capacity and transmission bandwidth.

Storage space and bandwidth optimization may also be achieved by storing select portions of the footage. For example, frames of the footage may be compared to determine whether there are material changes—for example, changes to the face or background. If there are no material changes then only a few frames may be saved for a given transaction. The saved frames may be determined based on the quality of the image. Whether the full transaction or portions thereof are saved may be determined by a preference setting or may be determined based on the type, risk, and/or value of the transaction as described above. In other embodiments, a larger portion of the footage may be stored initially but after a period of time has passed, frame analysis may be performed to reduce the size of the saved file.

An embodiment of the invention may also determine if an identifying characteristic is present in the output from the camera or footage. Determining the presence of an identifying characteristic may be done using image recognition techniques known in the art. The image recognition techniques may include facial detection to determine whether a face is being captured by the camera. The facial detection techniques may not specifically identify the face or compare the face to any stored or known faces. Not storing the faces for comparison purposes but maintaining footage of the transaction may prevent unauthorized access to an account without requiring the storage of biometric data. Not storing the biometric data may decrease the amount or storage space necessary for the system.

Facial detection techniques may also differentiate a face captured by the camera from a two-dimensional photo using the methods known in the art. For example, the facial detection software may have liveness detection which may ensure that the eyes of the subject of the photo are not still. In other embodiments, the footage from the camera may indicate depth. For example, the camera might use inferred dot or grid projection for capturing images or footage. If the camera does have three-dimensional capability, the facial detection software may be configured to determine whether a three-dimensional person is present. Differentiating a three-dimensional image from a two-dimensional image may prevent unauthorized access to an account using a photograph or picture. Further, it may prevent fraud claim by obscuring the camera with a picture of themselves.

If a face is present, the server may allow the user device to access the account or perform a transaction. In some embodiments the server may continually monitor the output from the camera. If the camera is turned off or a face is not detected in the camera footage, the user device may be denied access to the account.

An account owner may make a fraud notification for a transaction or activities. The account owner may identify the potentially fraudulent transaction. The footage taken during that transaction may be retrieved by the user device or a third party. The footage may be reviewed to determine whether the transaction was made by an authorized party. If the transaction was not made by an authorized party, the transaction may be cancelled. In some embodiments, the footage may be analyzed for distinguishing characteristics, for example the face may be analyzed using facial detection by a person or software. Footage may be captured for a number of transaction from a number of users. All footage may be stored on the server. The footage stored on the server may then be analyzed to determine if the identifying characteristic is present in other transactions associated with the user's account or other users' accounts. If the identifying characteristic is present, a potential fraud notification may be generated. The transaction associated with the footage may be reviewed to detect fraud. For instance, the footage may be sent to an individual to review and identify the person captured in the footage. In other embodiments, a facial detection algorithm may be employed to determine whether the person captured in the footage is an authorized user.

With reference to FIG. 1, an exemplary system includes a general-purpose computing device 100, including a processing unit (CPU or processor) 120 and a system bus 110 that couples various system components including the system memory 130 such as read-only memory (ROM) 140 and random access memory (RAM) 150 to the processor 120. The computing device 100 can include a cache of high-speed memory connected directly with, in close proximity to, or integrated as part of the processor 120. The computing device 100 copies data from the memory 130 and/or the storage device 160 to the cache for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer-readable storage media provide nonvolatile storage of computer-readable instructions, data structures, program modules and other data for the computing device 100. In one aspect, a hardware module that performs a particular function includes the software component stored in a tangible computer-readable storage medium in connection with the necessary hardware components, such as the processor 120, system bus 110, an output device 170 that might be a display, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the computing device 100 is a small, handheld computing device, a desktop computer, or a computer server.

Although the exemplary embodiment described herein employs the storage devices 160 that may be a hard disk, other types of computer-readable media which can store data that are accessible by a computer, such as magnetic cassettes, flash memory cards, digital versatile disks, cartridges, random access memories (RAMs) 150, and read-only memory (ROM) 140, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

Figure 2:
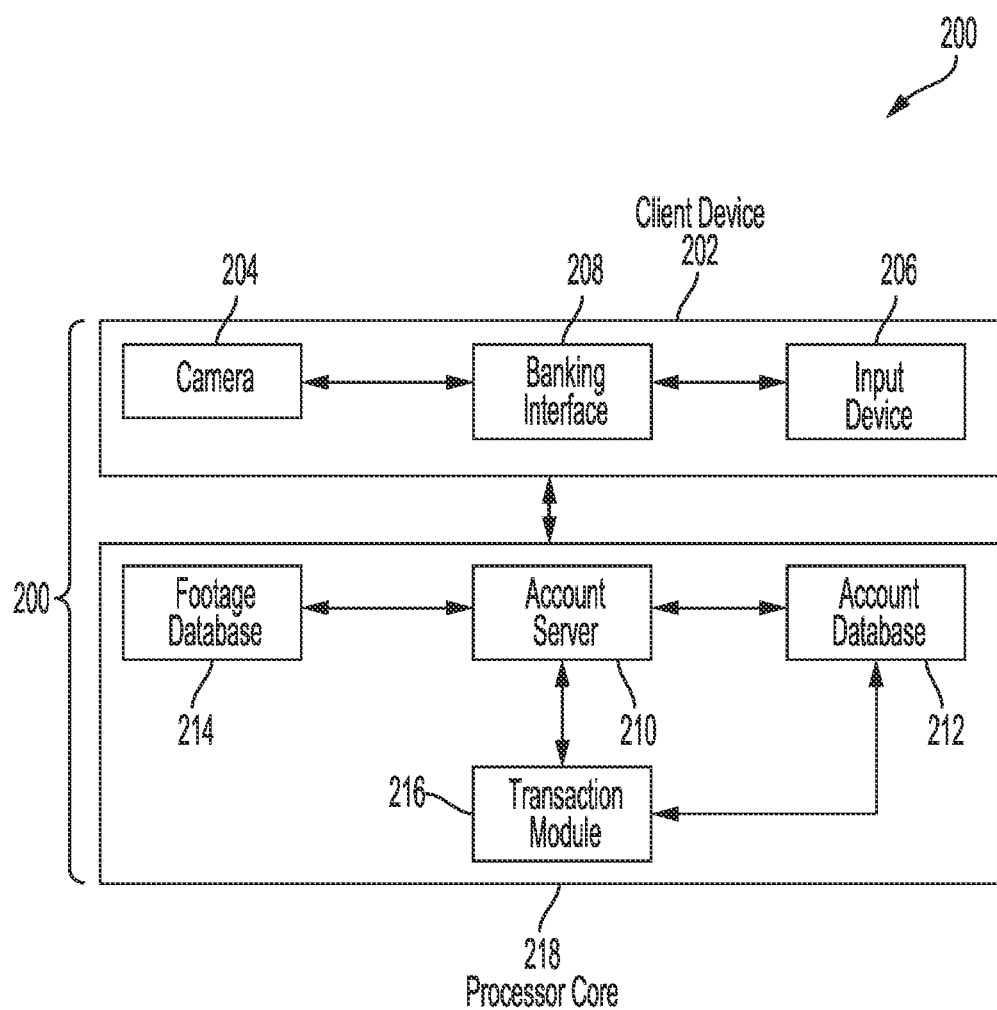
FIG. 2 illustrates an example system embodiment.

FIG. 2 is an example embodiment of system 200. System 200 may have a user device 202. The user device may be a personal computing device which, for example, may include mobile or smart phone, a tablet, a computer lap top, a computer desk top, etc. The user device 202 may have a camera 204 that may be connected to a network, the internet, etc. The camera may be a webcam. The camera 204 may be communicatively connected to a user interface 208. The user interface 208 may be a website or an application that may be hosted on, or accessed by, a smart phone or a computer. Camera 204 may be configured to send an image or a video footage to user interface 208. User interface 208 may be configured to activate camera 204 or provide a prompt for user device 202 to activate camera 204. The user interface 208 may also be communicatively coupled to input device 206. Input device 206 may be a touch screen, computer mouse, keyboard, or any of the computer input devices known in the art. The input device 206 may allow a user to send information or make requests from the user device 202. For example, the input device may be a keyboard that allows a user to navigate to a website and may allow the user to input the name of an account or credentials of the account such as an account identifier.

User interface 208 may be communicatively coupled to a processor core 218. Processor core 218 may include a server that hosts software that controls transactions on the account and information about the account. Processor core 218 may communicate with user device 202 via an account server 210. Account server 210 may be configured to communicate with software or databases related to the account. Account server 210 may be communicatively coupled to an account database 212. Account database 212 may contain records associating information with the account. The information may include a webcam security preference, security credentials, or other information about the account. The security credentials may include an account name, password, biometric information about a user of the account, or user questions. Other information may be the type of account, data about the account or account user, or values associated with the account. Account server 210 may access information from the account database when a user device attempts to access the account. In some embodiments, the user device 202 may provide the name or identification of the user of the account and the account server may retrieve information about the account from the account database 212. For example, a user may reach a website using a personal computing device. The user, through the personal computing device, may then open an application or access a website that communicates with the server hosting the user account. The user may then enter an account identifier such as a user name and a security credential. The account identifier and security credential may then be sent to the account server 210. The account server 210 may verify that the security credential, such as a password, corresponds with the credential stored on account database 212 for that account. In other embodiments, the user device may be approved to access the account and may automatically send information to the account server 210 identifying the user device 202. In other embodiments, biometric data may be used to verify the user of the account.

The account server 210 may also retrieve a webcam security preference from the account database 212. The webcam security preference may include an instruction not to allow access to the account when the camera is not on or when a user is not present on the camera. The instruction may not require identification of the user, instruction may simply require that the camera 204 must be on and/or a person must be in view of the camera. If there is a webcam security preference, an instruction may be sent from account server 210 to the user interface 208. The user interface may then cause the camera 204 to be activated. The user interface 208 may send an instruction to turn the camera on automatically or provide a prompt for the user to turn on camera 204. If the camera 204 is turned on, the user interface 208 may receive the footage from the camera and a notification that the camera is on. The notification and the footage may be sent to the account server 210. The account server 210 may send the footage or images from the camera to a footage database 214. The footage or images may be associated with the account or transaction and saved on the footage database 214. In some embodiments, the account server 210 may analyze the images or footage from the camera to determine whether a human face is recognizable. The account server 210 may have an additional feature that validates that a person is present in the footage, and a picture is not being used to bypass the webcam security preference.

The validation may be done by determining that the detected face is three-dimensional, by tracking eye movement in the footage, depth perception, frame-by-frame comparison, or using any other validation method. If a three-dimensional human face is not recognizable, the account server 210 may send an instruction to the user interface 208 to notify the user to adjust the camera so that a face is recognizable. If the camera is on and a three-dimensional human face is recognizable, access to the account may be granted and the account information may be retrieved from the account database 212. If a three-dimensional human face is not recognizable, a fraudulent access attempt may be detected. The fraud may be, for example, using a photograph of an authorized user, and access may be denied. The account information may be sent to the account server 210 which may then provide the account information to the user interface 208. The account information may then be displayed to a user.

The user may also use the input device to interact with the account, such as to make a purchase, deposit a check, transfer funds, etc. A desired transaction may be communicated with the account server 210. A transaction module 216 may perform the transaction and update the account database 212 to reflect new values based on the transaction. The transaction also may be associated with the images or footage in the database. The account server 210 may continuously monitor the images or footage to determine whether the camera is still active and/or whether a face is identifiable while the user is accessing the account. If the camera is turned off or a face is no longer visible, the account server may terminate access to the account. In some embodiments, the user interface 208 may send an instruction to the camera 204 to deactivate when the user is done accessing the account. Whether the user is done accessing the account may be detected by the user logging out of the account or navigating away from the website.

Figure 3:
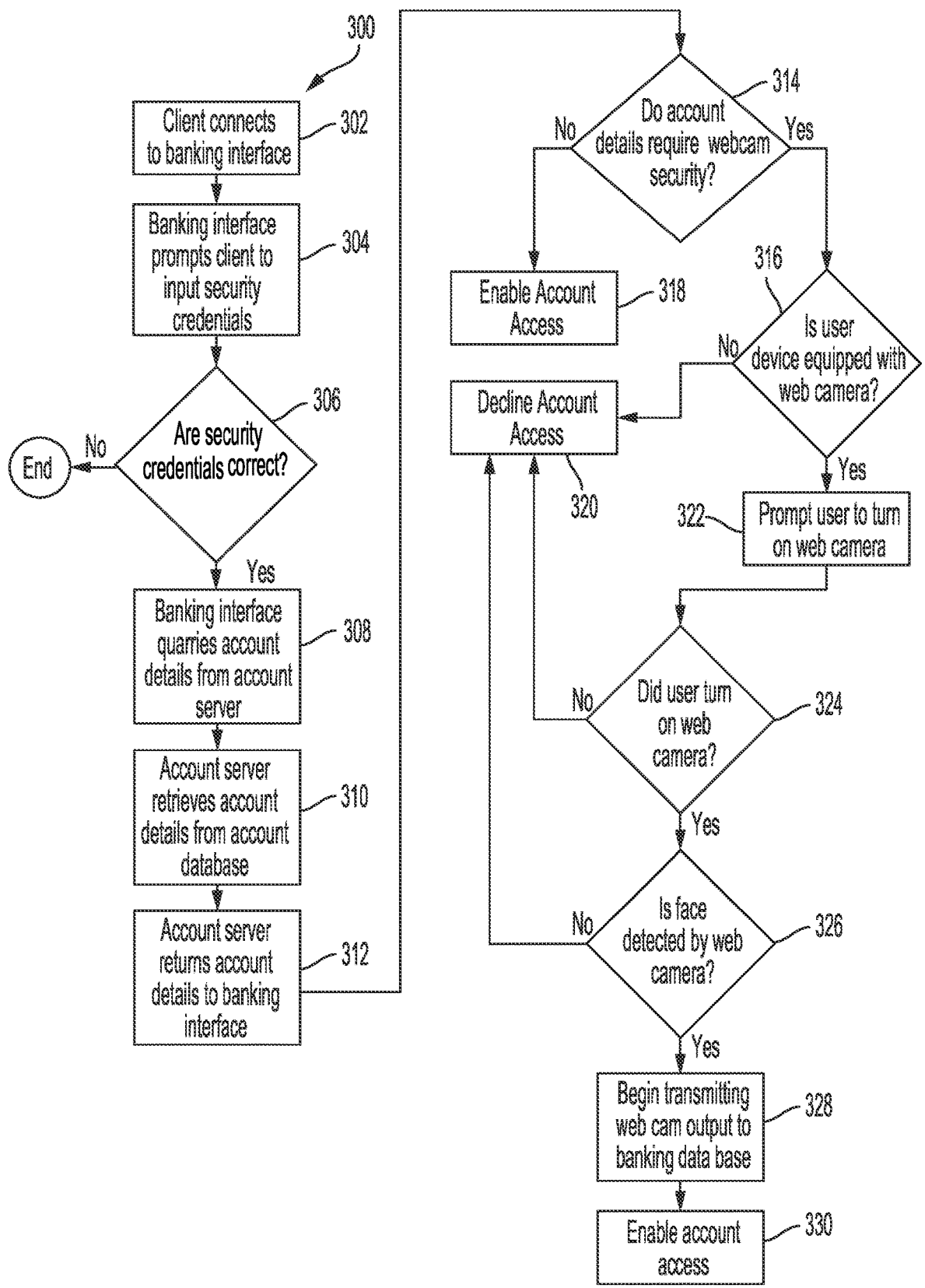
FIG. 3 illustrates an example method embodiment.

FIG. 3 depicts an example method 300. At 302 a client device may connect to a user interface. The client device may be a mobile phone or a user's personal computing device. The user interface may be an application or a website. The security credentials may then be entered into the user device by a user, or they may be automatically supplied by the user device. For example, the user device may be authorized to access the account such that the security detail may be the IP address of the user device. If a credential is manually entered, the user interface may provide a prompt or an area for the security detail to be input at 304. The account may be identified by a user name, account number, or biometric data provided by the user device. The user name or account number may be input by the user or associated with, or provided by, the device. For example, the IP address of the user device may identify the account. At 306, the credentials may be compared to the credentials of the account.

At 308 the user interface may query an account server for the details of a user's account. The user may specify a webcam security requirement that requires visual recordation when the account is accessed. A webcam security requirement may also be automatically required for certain types of accounts. In other embodiments the webcam security requirement may depend on the specific device that is used to access the account.

At 310, account details for the identified account may be retrieved from an account server. The account details may include the type of account, details relating to the account, balances, credits of the account, a password, etc. At 312 the account server may return account details to the user interface.

At 314, the user interface may determine whether the account details include a webcam security requirement. If there is no webcam requirement, the method may allow the client to access the account at 318.

If the account has a webcam security requirement, the method may determine whether the user device is equipped with a camera at 316. If the user device is not equipped with a camera at 316, access to the account may be declined at 320. If the user device is equipped with a webcam, the user device may prompt a user to turn on the webcam at 322. At 324, the method may determine whether the webcam was activated. If the webcam is not activated at 324, access to the account may be declined at 320. If the webcam is turned on at 324, the presence of a face may be detected by the webcam at 326. A detected face may not be specific to the individual, the detection of a face may simply be a determination that a face is identifiable if the webcam output is further analyzed. Thus, there may be no need to store the image or biometric data for the account of an authorized user. If a face is not detected at 326, the user device may be denied access to the account at 320. If a face is detected at 326, the footage from the webcam may be provided to a remote database. The footage may be provided using any network, such as internet, wifi, and/or a cellular network. After the footage is received at 328, the system may allow the user device to access the account. The footage from the webcam may continue to be monitored to determine whether the face is still detected. In these embodiments, access to the account may be terminated if the webcam is turned off or a face is no longer detected. In other embodiments, the footage from the webcam may be stored only when a transaction takes place. The footage may be associated with the corresponding transaction on the database. In other embodiments, the webcam may only take an image or a series of images and store them on the database at 328. Taking an image or a series of images may be advantageous to save storage space on the database. An embodiment may take the image(s) that are the most clear or most identifying.

Figure 4:
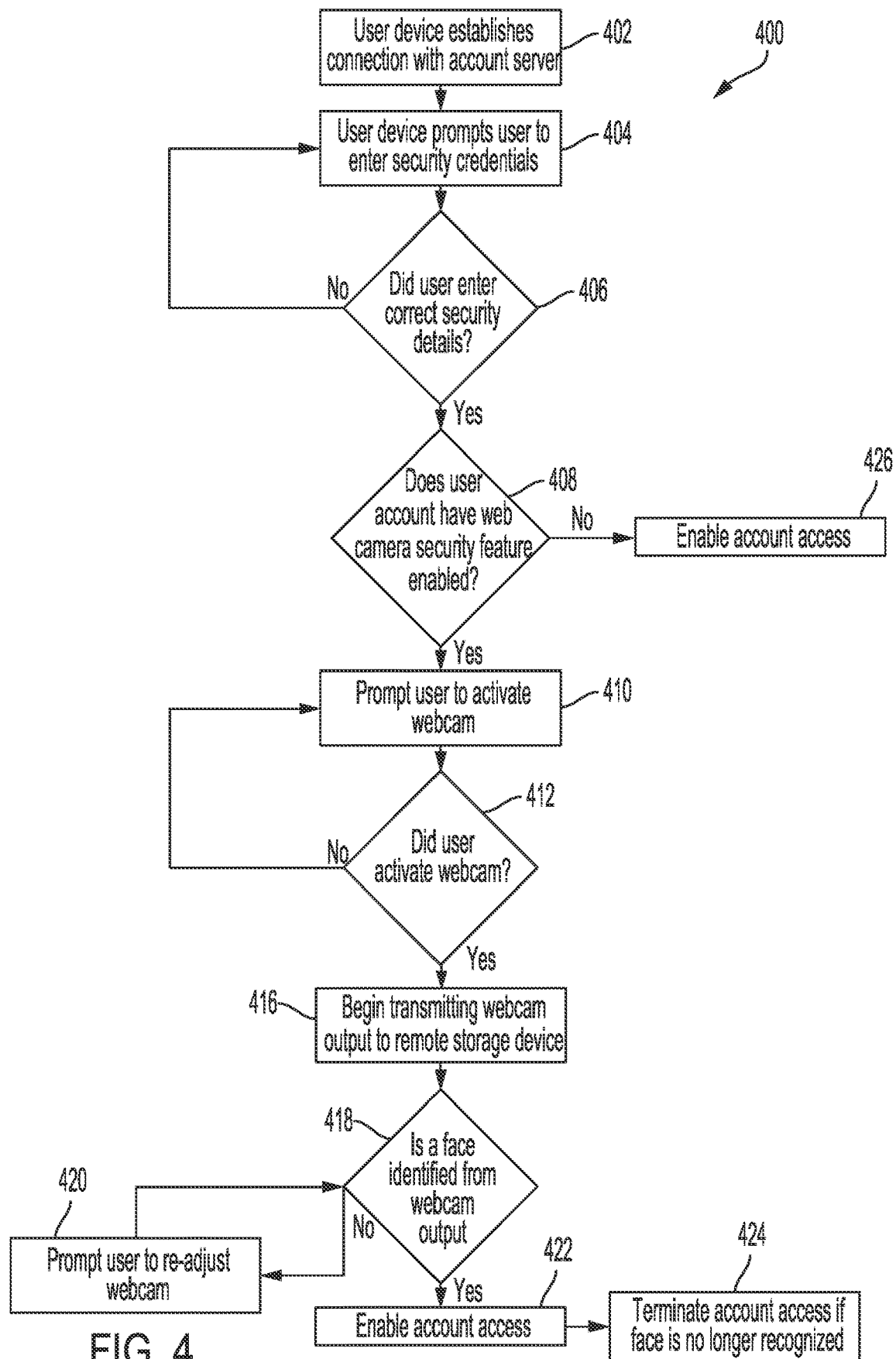
FIG. 4 illustrates an example method embodiment.

FIG. 4 depicts example method 400. At 402 a user device may establish a connection with an account server. The user device may navigate to a website or open an application. At 404 the user device may prompt the user to enter security credentials which may include an account identifier and a password. At 406 the account server may determine whether the password corresponds to the account identifier. If the password does not correspond to the account identifier, the user device may provide another prompt allowing the user to make another attempt. Prompts to re-enter a password may continue to be sent until a matching account identifier and password are entered. In some embodiments the account server may suspend access to the account until user identity is verified by another means or for a set amount of time. When the password corresponding with the account identifier is entered, the server may determine if the account has a webcam security feature at 408. The webcam security feature may be a webcam security preference that was set by the user of the account. If the account does not have a webcam security feature, the user device may be allowed to access the account at 426. If there is a webcam security feature, the user device may be sent an instruction to generate a prompt to turn on the webcam at 410. The user device may then monitor whether the webcam is activated and may send the activation status of the webcam to the account server. If the webcam is not activated after a given time, the prompt to activate the webcam may be re-generated until the webcam is activated. When the webcam is activated at 412, the output from the webcam may be transmitted to a remote storage device, such as a footage database, where the webcam output may be stored. The webcam output may be associated with a specific event, time, account, or transaction on the storage device. The remote storage device may store the webcam output for a set amount of time. In some embodiments the webcam output may be compressed, edited, or automatically deleted after the set amount of time has passed. The webcam output may also be compressed or modified before the webcam output is committed to the storage device. At 418, the method may determine whether there is a face or distinguishing characteristic in the output from the webcam. A face may be identified using image recognition software. If a face is not identified, a prompt may be generated to adjust the webcam so that a face is identified at 420 and return to 418. If a face or identifying feature is present at 418, access may be granted to the user account at 422. At 424, the account server may continue to monitor whether the webcam is on and may continue to determine whether there is a face or identifying characteristic. If there is no face or identifying characteristic, the account server may terminate access to the account by the user device.

Figure 5:
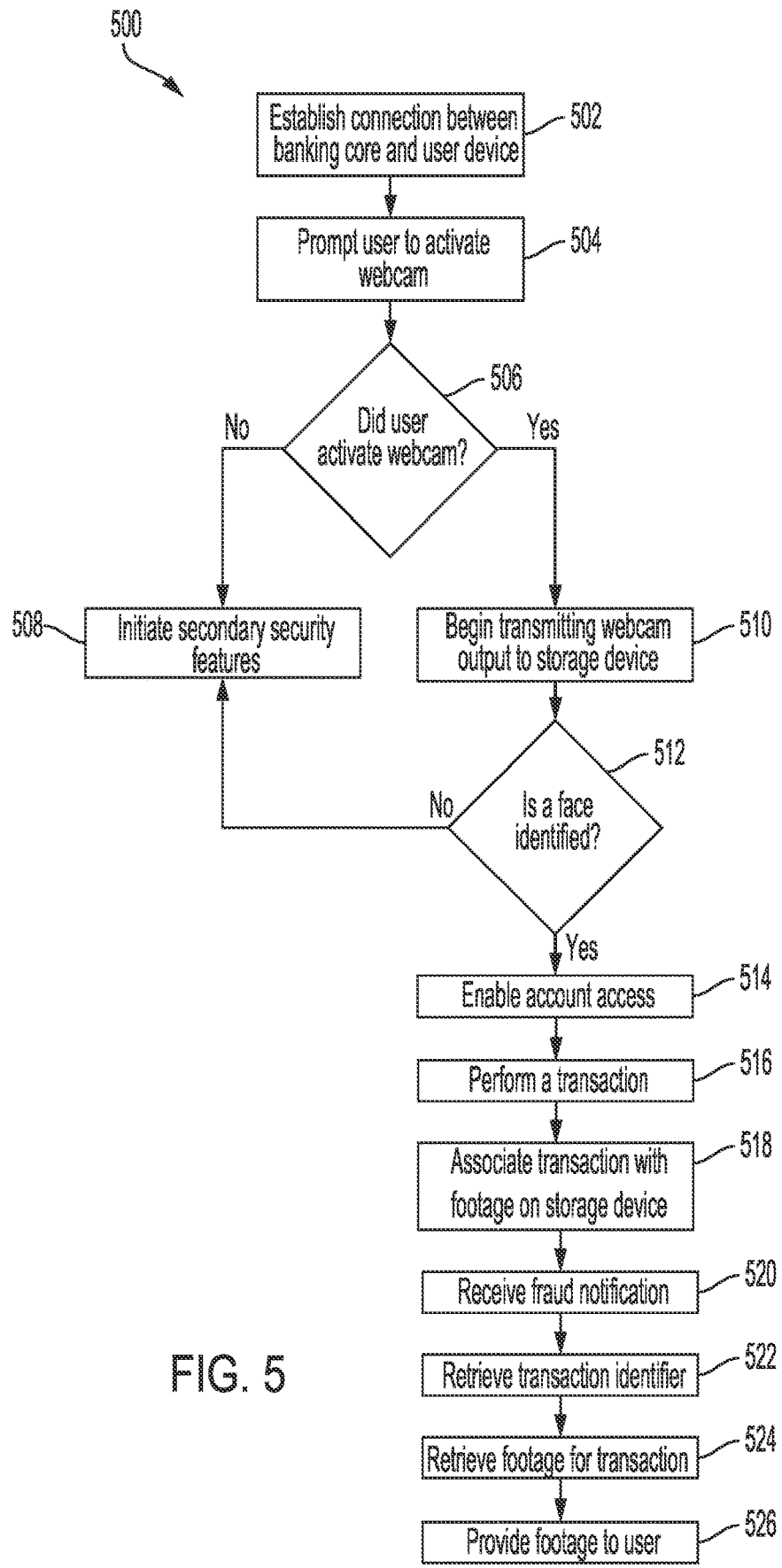
FIG. 5 illustrates an example method embodiment.

FIG. 5 depicts an exemplary method 500. At 502 a connection between a processing core and a user device is established. A processor core may be hosted and operated by an account provider and may host or communicate with database storing account information. The processor core may be, or be a part of, the account server. At 504, the processor core may send the user device a prompt to activate a webcam. At 506, the processor core may determine whether the user accepted the prompt to turn on the webcam. If the webcam is activated at 506, the output of the webcam may be provided to a storage device at 510. The storage device may be in communication with or within the processor core. At 512 processing core may determine whether a face is identifiable in the output. If the user did not activate a webcam at 506, or a face is not identifiable in the webcam output at 512, the processor core may initiate additional security features at 508. The additional security features may be any of the multi-factor authorization techniques known in the art. For example, the user may be required to answer questions verifying the identity of the person attempting to access the account. In other embodiments the processor core may require the user to call a representative to confirm authorization. In still further embodiments, the user may receive a onetime pin on another device that must be entered to access the account.

If a face is identifiable at 512, the processor core may allow the user device to access the account at 514. While the user device is accessing the account, the user may perform a transaction on the account at 516. The transaction may be assigned a transaction identifier that is specific to the transaction. At 518, the transaction may be associated with the footage and stored in a footage database or a file storage system. In some embodiments the footage may be saved to a file storage system along with the transaction identifier. The transaction identifier may be stored on a database. The database may be queried for the transaction identifier and used to retrieve the associated file from the file storage system. In other embodiments, the webcam output may be stored on the database at a location that is determined using, for example, the transaction identifier. At 520, the method may receive a fraud notification. The fraud notification may be sent by a user when the user notices suspicious activity on the account. In other embodiments, the system that hosts the account may generate a fraud notification. If a fraud notification is received at 522, the transaction identifier associated with the potentially fraud transaction may be identified in the database. At 524, the transaction identifier may be used to retrieve the footage or images of the transaction from the file storage system. The footage may then be provided to the user, account host, or interested party at 525. In other embodiments the footage may be stored at a location based on the account that was accessed. The images or footage may be reviewed to determine if the person in the image or footage was an authorized user. Using general detection of a face instead of matching a specific face to an approved face may not require storing biometric data, further preserving user privacy. Nonetheless, having a recordation of a user face may discourage a user from claiming that a valid transaction is fraudulent to avoid payment. Having a recordation of a user face may further discourage an unauthorized person from making an unauthorized transaction. In other embodiments, when a fraud is detected, a facial detection method may be performed on the images or footage of an identified fraudster to detect identifying characteristics. The method may then review additional transactions stored in the database to identify whether the associated footage has any similar characteristics with the fraudulent transaction. If these characteristics are found, the additional transaction may be flagged as possibly fraudulent. The associated account may then be determined based on the transaction identifier. The footage may be sent to the account holder or another interested party to determine if the transaction was fraudulent. The identifying characteristic may be a face, etc. or something in the background, for example, a street sign, etc.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

What is claimed is:

1. A system for facilitating image-feature malicious-activity detection and access prevention, where an activity notification associated with a transaction triggers feature detection for at least one image related to a different transaction, the system comprising:
   one or more processors programmed with instructions that, when executed by the one or more processors, cause operations comprising:
      receiving a first image from a first user device in connection with a first transaction effectuated via the first user device, and storing a representation of the first image from the first user device;
      associating the representation of the first image with the first transaction;
      receiving a second image from a second user device in connection with a second transaction effectuated via the second user device, and storing a representation of the second image from the second user device;
      associating the representation of the second image with the second transaction;
      in response to receiving a malicious activity notification associated with the first transaction, retrieving the representation of the first image and analyzing the representation of the first image to detect an identifying characteristic; and
      in response to a determination that the identifying characteristic is present in the representation of the second image being above a predetermined degree of certainty, preventing access to an account related to the second transaction.

2. A method comprising:
   receiving a first image from a first user device in connection with a first transaction effectuated via the first user device;
   associating a representation of the first image with the first transaction;
   receiving a second image from a second user device in connection with a second transaction effectuated via the second user device;
   associating a representation of the second image with the second transaction;
   receiving a warning associated with the first transaction;
   analyzing the representation of the first image to detect an identifying characteristic;
   determining that the identifying characteristic is present in the representation of the second image, the determination that the identifying characteristic is present in the representation of the second image being above a predetermined degree of certainty; and
   preventing access to an account related to the second transaction based on the determination that the identifying characteristic is present in the representation of the second image being above the predetermined degree of certainty.

3. The method of claim 2, wherein the first image is derived from a video captured by the first user device.

4. The method of claim 2, further comprising preventing access to the account related to the second transaction comprises terminating access to the account related to the second transaction.

5. The method of claim 2,
   wherein analyzing the representation of the first image comprises analyzing the representation of the first image to detect a face in the first image,
   wherein the determination that the identifying characteristic is present in the representation of the second image comprises determining that the face in the first image is present in the representation of the second image, and
   wherein preventing access to the account related to the second transaction comprises preventing access to the account related to the second transaction based on the determination that the face in the first image is present in the representation of the second image.

6. The method of claim 2,
   wherein analyzing the representation of the first image comprises analyzing the representation of the first image to detect a background object in the first image,
   wherein the determination that the identifying characteristic is present in the representation of the second image comprises determining that the background object in the first image is present in the representation of the second image, and
   wherein preventing access to the account related to the second transaction comprises preventing access to the account related to the second transaction based on the determination that the background object in the first image is present in the representation of the second image.

7. The method of claim 2,
   wherein analyzing the representation of the first image comprises analyzing the representation of the first image to detect a face in the first image without comparing the face to a known face of a person,
   wherein the determination that the identifying characteristic is present in the representation of the second image comprises determining that the face in the first image is present in the representation of the second image without comparing the face to a known face of a person, and
   wherein preventing access to the account related to the second transaction comprises preventing access to the account related to the second transaction based on the determination that the face in the first image is present in the representation of the second image.

8. A non-transitory computer-readable media storing instructions that, when executed by one or more processors, cause operations comprising:

receiving a first image from a first user device in connection with a first transaction effectuated via the first user device;
associating a representation of the first image with the first transaction;
receiving a second image from a second user device in connection with a second transaction effectuated via the second user device;
associating a representation of the second image with the second transaction;
receiving a warning associated with the first transaction;
analyzing the representation of the first image to detect one or more identifying characteristics; and
preventing access to an account related to the second transaction based on a determination that the one or more identifying characteristics are present in the representation of the second image.

9. The non-transitory computer-readable media of claim 8, wherein the first image is derived from a video captured by the first user device.

10. The non-transitory computer-readable media of claim 8, further comprising preventing access to the account related to the second transaction comprises terminating access to the account related to the second transaction.

11. The non-transitory computer-readable media of claim 8,
wherein analyzing the representation of the first image comprises analyzing the representation of the first image to detect a face in the first image,
wherein the determination that the one or more identifying characteristics are present in the representation of the second image comprises determining that the face in the first image is present in the representation of the second image, and
wherein preventing access to the account related to the second transaction comprises preventing access to the account related to the second transaction based on the determination that the face in the first image is present in the representation of the second image.

12. The non-transitory computer-readable media of claim 8,
wherein analyzing the representation of the first image comprises analyzing the representation of the first image to detect a face in the first image based on eye movement related to the face in the first image,
wherein the determination that the one or more identifying characteristics are present in the representation of the second image comprises determining that the face in the first image is present in the representation of the second image, and
wherein preventing access to the account related to the second transaction comprises preventing access to the account related to the second transaction based on the determination that the face in the first image is present in the representation of the second image.

13. The non-transitory computer-readable media of claim 8,
wherein analyzing the representation of the first image comprises analyzing the representation of the first image to detect a background object in the first image,
wherein the determination that the one or more identifying characteristics are present in the representation of the second image comprises determining that the background object in the first image is present in the representation of the second image, and
wherein preventing access to the account related to the second transaction comprises preventing access to the account related to the second transaction based on the determination that the background object in the first image is present in the representation of the second image.

14. The non-transitory computer-readable media of claim 8,
wherein analyzing the representation of the first image comprises analyzing the representation of the first image to detect a face in the first image without comparing the face to a known face of a person,
wherein the determination that the one or more identifying characteristics are present in the representation of the second image comprises determining that the face in the first image are present in the representation of the second image without comparing the face to a known face of a person, and
wherein preventing access to the account related to the second transaction comprises preventing access to the account related to the second transaction based on the determination that the face in the first image is present in the representation of the second image.

15. The non-transitory computer-readable media of claim 8,
wherein analyzing the representation of the first image comprises analyzing the representation of the first image to detect a non-biometric feature in the first image,
wherein the determination that the one or more identifying characteristics are present in the representation of the second image comprises determining that the non-biometric feature in the first image is present in the representation of the second image, and
wherein preventing access to the account related to the second transaction comprises preventing access to the account related to the second transaction based on the determination that the non-biometric feature in the first image is present in the representation of the second image.

16. The non-transitory computer-readable media of claim 8,
wherein analyzing the representation of the first image comprises analyzing the representation of the first image to detect a biometric feature in the first image based on differentiations between a two-dimensional image and a three-dimensional image,
wherein the determination that the one or more identifying characteristics are present in the representation of the second image comprises determining that the biometric feature in the first image are present in the representation of the second image, and
wherein preventing access to the account related to the second transaction comprises preventing access to the account related to the second transaction based on the determination that the biometric feature is present in the representation of the second image.

* * * * *